Figure 1:
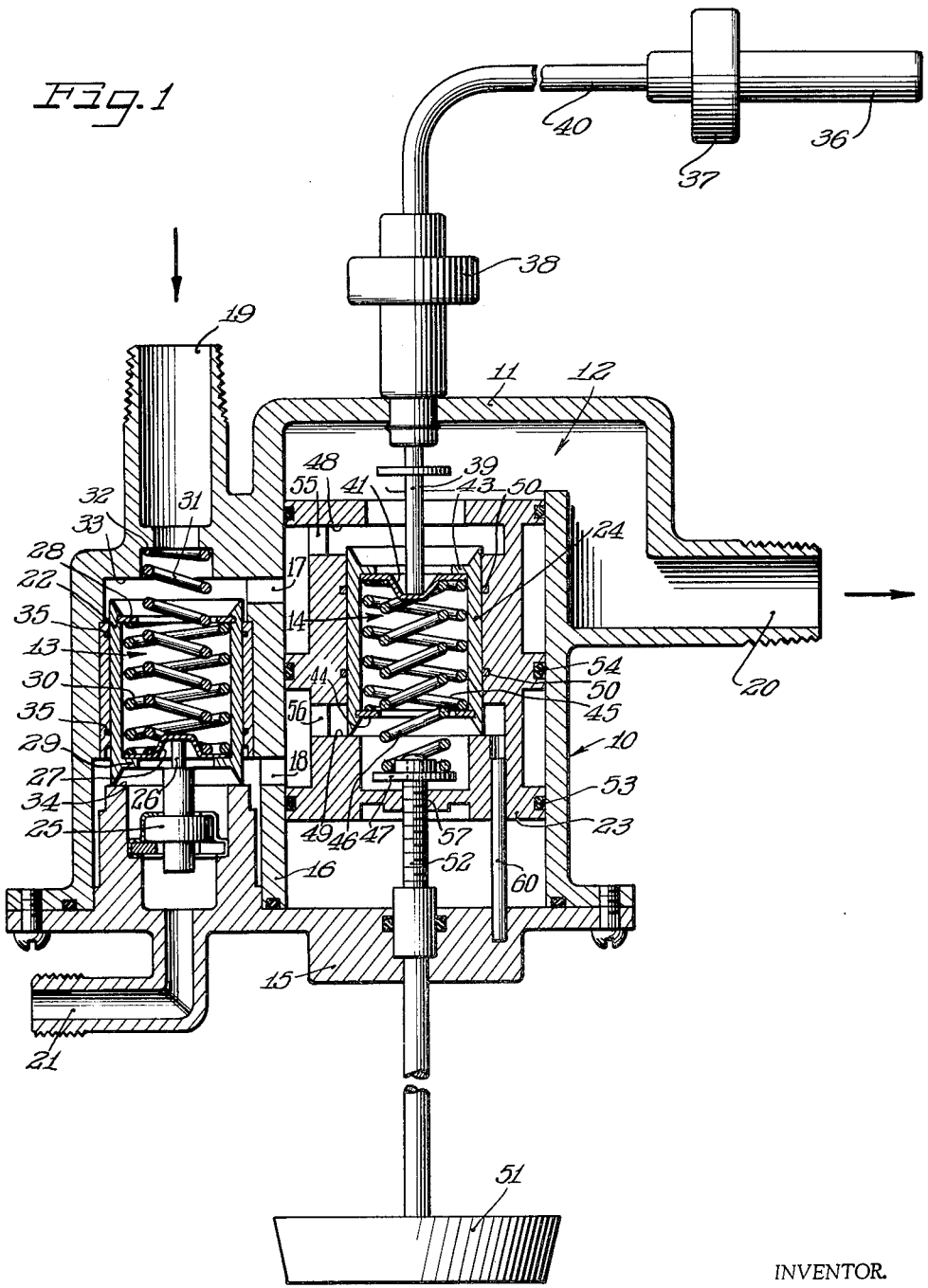

Sept. 21, 1965    R. W. COUFFER    3,207,434
HEATING AND COOLING ZONE VALVE
Filed Sept. 13, 1963    2 Sheets-Sheet 1

INVENTOR.
Robert W. Couffer
BY
ATTORNEYS

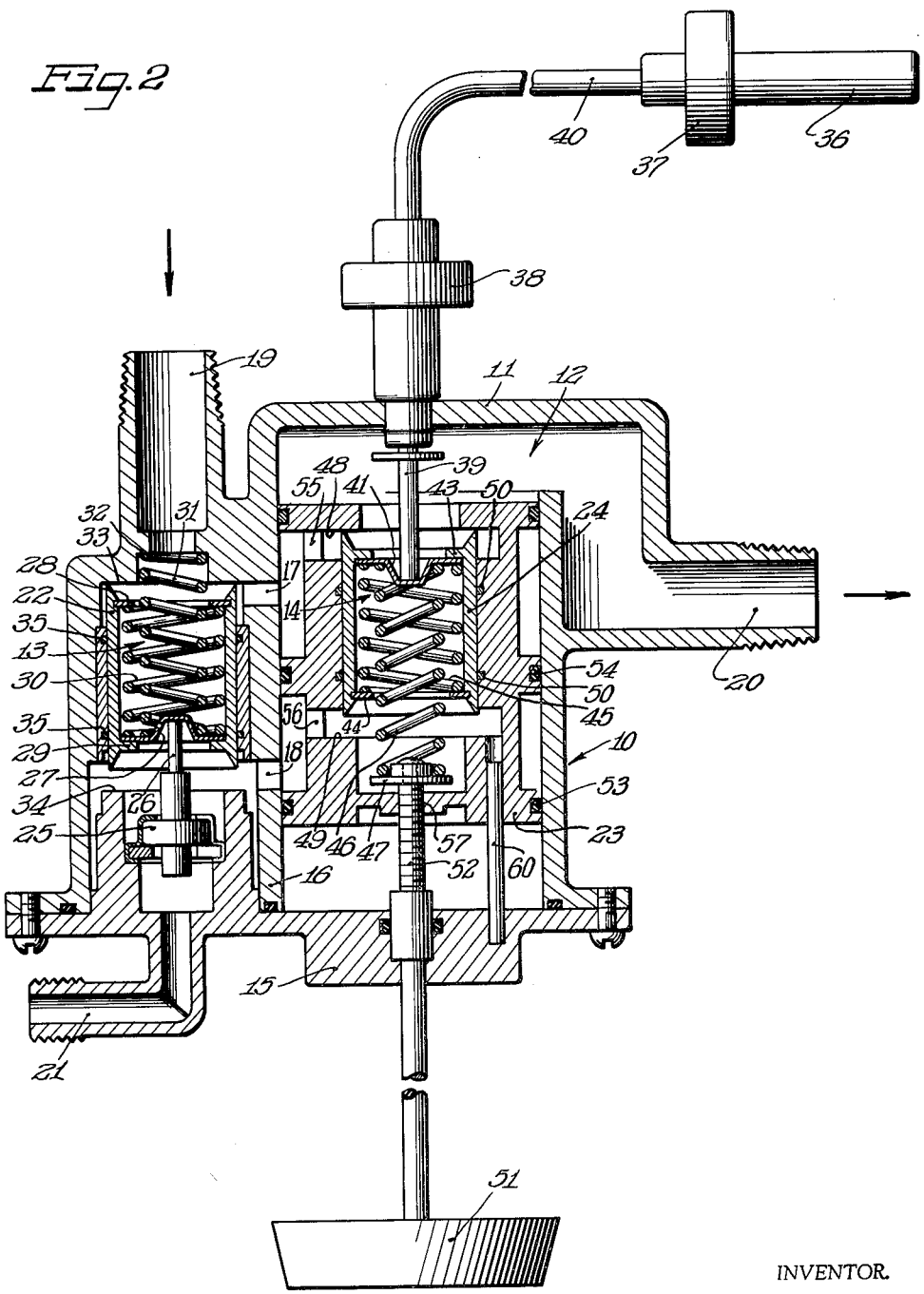

United States Patent Office 3,207,434
Patented Sept. 21, 1965

3,207,434
HEATING AND COOLING ZONE VALVE
Robert W. Couffer, Deerfield, Ill., assignor to The Dole Valve Company, Morton Grove, Ill., a corporation of Illinois
Filed Sept. 13, 1963, Ser. No. 308,899
1 Claim. (Cl. 236—1)

The present invention relates to fluid control valves and more particularly relates to a thermostatic fluid control valve which is designed for use in a liquid heating and cooling system employing means to automatically convert the valve from heating to cooling control in accordance with the temperature of liquid flowing through the system and employing a separate thermally actuable modulating valve to control the flow of the liquid through the valve. Such control is accomplished by means of movable feed valves as will hereinafter become apparent.

Valves which are operable thermostatically to regulate the convectors in a given zone are commonly referred to as zone valves. Such valves can be employed to control the flow of heated or cooled liquid through radiators or the like. There is an increase in trend toward the usage of such zone valves, particularly in apartments and motels as well as in large homes where single point thermostatic control of multiple heating units is not deemed entirely satisfactory.

Recently, attempts have been made to use the fluid circulating systems required to heat such living quarters in the winter in a second capacity—as a circulating system for cooled liquid during the summer to provide air conditioning. However, most thermostatically actuable fluid control valves are not adapted for use in such types of systems. Those valves which are convertible from heating to cooling control generally required manual conversion which of course is undesirable.

It is therefore an object of the present invention to provide a zone valve for use in a fluid circulating system which will automatically convert itself from heating to cooling control and vice versa as a function of the temperature of liquid flowing through the system.

Another object of this invention resides in the provision of a simple valve structure having a selector valve member therein which valve member will orient the valve for controlling the flow of hot or cold liquid through the system in accordance with the temperature of that fluid itself.

A still further object of the invention resides in the provision of a valve having a selector valve member therein as is mentioned above and including also a separate valve member for modulating the flow of liquid through the regulating system; this latter valve member being operable as a function of temperature in the zone.

These and other objects and advantages of the present invention will become apparent from time to time as the following specification proceeds and with reference to the accompanying drawings, wherein:

FIGURE 1 is a vertical sectional view through a valve structure constructed in accordance with the principles of the present invention and showing various parts thereof in a first given position; and FIGURE 2 is another vertical sectional view of the system illustrated in FIGURE 1 but showing a number of parts thereof in a second operating position.

The valve 10 comprises a casting 11 (containing three chambers 12, 13, and 14) and a bottom plate 15. The chambers 13 and 14 are substantially cylindrically shaped and are separated by a wall 16 having a first port 17 and a second port 18 therein. The valve 10 has an inlet 19, an outlet 20, and a by-pass 21. A first sleeve 22 is positioned for movement within the chamber 13, a second sleeve or modulating sleeve valve 24 is positioned for movement within the chamber 14, and a third sleeve 23 is positioned for movement outside of the second sleeve 24.

A first thermally sensitive element 25 is located adjacent the by-pass 21, and has an operating plunger 26 extending against a retainer 27 within the sleeve 22. The inner surface of the sleeve 22 has a lip 28 at one end, and a lip 29 at the other end thereof. A relatively stiff spring 30 rests against the lip 28 and holds the retainer 27 against the lip 29. A spring 31 rests against the shoulder 32 in the inlet 19 and against the retainer 27. The spring 31 thus serves to continuously urge the sleeve 22 downward, so as to press the retainer 27 against the plunger 26. The spring 30 being relatively stiff, transmits any upward movement of the plunger 26 to the sleeve 22 so as to move the sleeve 22 upward upon such movement of the plunger 26. The sleeve 22 is movable between an annular seat 33, and an annular seat 34. Fluid is prevented from passing between the wall of the chamber 13 and the outside of the sleeve 22 by two seal rings 35.

As previously described, a by-pass 21 is provided in the valve 10. In this manner fluid will continuously circulate through the system and water will not stand idle in the chamber 13, regardless of the position of the cooperating sleeve valves.

In order to automatically control the position of the sleeve 22 relative to the annular seats 33 and 34, the first thermally sensitive element 25 is preferably constructed so as to become actuated at approximately 60° F. In other words, the plunger 26 is fully retracted when ambient temperature is below 60° F., and is fully extended at ambient temperatures in excess of 60° F. Thus, when fluid at 35° F. passes through the by-pass 21, the plunger 26 will be retracted, and when fluid at 200° F. passes through the by-pass 21 the plunger will be fully extended. In FIGURE 2 the piston 26 is shown in its fully extended position. Notice that when the plunger 26 is in this position the sleeve 22 is pressed against the annular seat 33, thus preventing fluid from entering the port 17. Conversely, when the plunger is in its fully retracted position, as shown in FIGURE 1, the sleeve 22 is pressed against the annular seat 34, thus preventing fluid from entering the port 18.

A temperature sensing bulb 36 is coupled to a temperature responsive unit 37, which in turn, is communicable through an actuator 38 (having a movable piston 39) through a capillary 40. It is known to those skilled in the art that when the temperature ambient to the sensing bulb 36 rises above the critical temperature of the substance contained therein, that substance will expand. In the instant case, the actuator 38 is mounted on the casting 11 and the piston 39 rests against a retainer member 41. In this manner, the aforementioned expansion forces will be communicated through the capillary 40 to the actuator 38, causing the piston 39 to move outward relative to the actuator 38 so as to push the retainer 41 downward. The inner surface of the modulating valve 24 has a lip 43 at one end, and a lip 44 at the other end thereof. A relatively stiff overtravel spring 45 rests against the lip 44 and holds the retainer 41 against the lip 43. The stiff spring 45 transmits any downward movement of the plunger 39 against the retainer 41 to the sleeve 24 to move it downwardly also. A loading spring 46 is disposed between retainer 41 and a member 47 carried by an adjustable stem 52 having a hand operable knob 51. It will be observed that an annular seat 48 is formed at the upper end of the sleeve 23 as is the annular seat 49 formed on the same outer sleeve 23. The sleeve 23 is slidable within and sealed to the wall of the chamber 14 and the sleeve 24, of course, is movable within the sleeve 23. Sealing rings 50 serve to provide a fluid type seal between the sleeves 23 and 24 while sealing rings 53, 54 provide a seal between the sleeve 23 and the casting.

It will be understood that the retainers 27 and 41 are suitably apertured so as to permit fluid to flow freely past them and that the member holding thermal sensitive element 25 in position within the flow passageway just above the passage 21 and the annulus on which the element 25 is seated are each apertured (as is evidenced by the unsectioned portion of the bracket and annulus at the right hand side of the element 25 in the figures) to permit the free flow of fluid past the element 25 from the inlet 19 to the bypass outlet 21.

The upper end of the sleeve 23 is apertured as at 55 at a point opposite and in communication with the port 17, so that when the selector sleeve valve 23 is unseated from the seat 33 and the modulating sleeve valve 24 is unseated from the seat 48, liquid will pass from the inlet through the port 17 and thence the aperture 55 to and through the chamber 12 to the outlet 20. Likewise, the sleeve 23 is apertured as at 56 at a point opposite and in communication with the port 18 so that when the selector sleeve valve 22 is unseated the sleeve valve 24 will be effective to control the rate of flow of liquid to and through the valve assembly. Thus, the selector sleeve valve 22 is effective to direct all water at the inlet to and through one or the other of the ports 17 or 18 in accordance with the temperature of water at the inlet. The modulating valve 24 on the other hand is employed for controlling the rate of flow of fluid passing through one or the other of the ports 17, 18.

One of the very important features of the present invention lies in the manner of its performance during a changeover period from heating to cooling control or vice versa.

In FIGURE 2 the valve assembly is illustrated in a heating cycle with the modulating sleeve valve, which is controlled by the remote sensing element, controlling the rate of flow of hot water through the valve assembly. The selector sleeve valve 22 is seated on the seat 33 inasmuch as the power member 26 of temperature sensitive power unit 25 is fully extended due to the relatively high temperature of fluid ambient the sensing portion of that element.

If it be assumed for the purposes of illustration that the modulating sleeve valve is in a one-half open position relative to the flow path to and through the port 56, then the top or cold controlling port is also one-half open. Under this condition, if cold water is sent to the valve assembly, the selector sleeve valve will quickly shut off water flow to the hot side of the modulating sleeve valve (i.e., to the port 18) and direct it to the cold side of the modulating sleeve valve (i.e., the port 17). Thus, cold water will flow through the valve assembly at the same rate as the hot water was flowing therethrough just shortly before because the effective flow passage as controlled thermostatically by the modulating sleeve valve was one-half open in each instance prior to the changeover.

If the air temperature ambient the sensing bulb should drop, the modulating sleeve valve will begin to close off in the direction of the seat 48 and, conversely, if room temperature should then begin to rise the modulating sleeve valve will move away from the seat 48 to increase the effective flow area of the cold water port past the upper edge of that sleeve valve to allow more cold water to flow through the valve assembly and into the convector.

Thus, the heating and cooling curve will intersect in this design at the one-half maximum flow values.

To further illustrate the point, if during the heating cycle the hot water metering port had been only one-quarter open then the corresponding cold water metering port would have been three-quarters open and during the changeover the rate of flow of cold water would be considerably greater than the rate of flow of the hot water and the cooling effect would therefore be felt very much sooner in the zone.

It follows therefore that when the hot metering port during a heating cycle is shut off completely due to the temperature sensing bulb sensing a high room temperature, then when cold water is fed to the valve unit, the cold metering port will be full open and room temperature will immediately be reduced by this full flow of cold water. As a result of applicant's novel structure, when heating is least needed and when the valve is then changed over to a cooling cycle, the cooling effect will be at its maximum. The converse is obviously also true.

It should also be understood that many modifications and variations in the invention may be effected without departing from the spirit and scope of the novel concepts thereof.

I claim as my invention:

A fluid control valve comprising:

a valve body having an inlet communicable with a source of pressurized fluid, a circulating chamber communicabble with said inlet, a control chamber, and an outlet communicable with said control chamber;

a pair of spaced-apart ports communicating said circulating chamber with said control chamber;

a sleeve positioned within said circulating chamber for movement along the wall thereof whereby the said sleeve is movable to a position blocking one of said pair of ports or to a position blocking the other of said pair of ports;

a thermal sensitive element position within said circuating chamber and having a casing and having an operating plunger slidably guided within said casing and movable relative thereto in response to variances in temperatures ambient said casing;

passageway means providing a continuous circulation of fluid from said fluid source through said circulating chamber and over said casing and thence back to said source;

means coupling said operating plunger with said sleeve so that movement of said plunger will effect movement of said sleeve within said circulating chamber;

a temperature adjustment sleeve slidably positioned within said control chamber for movement along the wall thereof and having first and second axially spaced-apart apertures communicable respectively with each of said ports;

a temperature regulating sleeve disposed within said control chamber and slidably positioned within said adjustment sleeve for movement along the wall thereof;

said temperature regulating sleeve movable to a position blocking said first aperture and to a position blocking said second aperture, an actuating element having a casing and having a temperature sensing portion disposed remotely from said valve body and having a power member slidably guided for movement within said casing and extending into said control chamber, means coupling said power member with said temperature regulating sleeve
whereby movement of said power member caused by variances in temperatures ambient said sensing portion thereof will effect movement of said temperature regulating sleeve relative to said temperature adjustment sleeve; and
annular means coupled to said temperature adjustment sleeve and having an element extending exteriorly of said valve body for positioning said adjustment sleeve within said control chamber.

References Cited by the Examiner

UNITED STATES PATENTS

| | | | |
|---|---|---|---|
| 2,447,560 | 8/48 | Branson | 236—1 |
| 2,463,598 | 3/49 | Carson | 236—93 |
| 2,575,100 | 11/51 | Duey. | |
| 2,805,025 | 9/57 | Dillman | 236—1 |

EDWARD J. MICHAEL, *Primary Examiner.*